United States Patent [19]
Newstead et al.

[11] 3,913,708
[45] Oct. 21, 1975

[54] DISC BRAKE ASSEMBLIES FOR VEHICLES

[75] Inventors: Charles Newstead, Walsall; Andrew Charles Walden Wright, Lapworth, both of England

[73] Assignee: Girling Limited, Birmingham, England

[22] Filed: Dec. 21, 1973

[21] Appl. No.: 427,107

[30] Foreign Application Priority Data
Dec. 22, 1972 United Kingdom............... 59441/72

[52] U.S. Cl. .......... 188/71.9; 188/72.7; 188/196 BA
[51] Int. Cl.² ................. F16D 55/224; F16D 65/46
[58] Field of Search ....... 188/71.8, 71.9, 72.6, 72.7, 188/72.8, 72.9, 79 SK, 196 BA

[56] References Cited
UNITED STATES PATENTS

| | | | |
|---|---|---|---|
| 2,144,019 | 1/1939 | Goepfrich | 188/71.9 |
| 3,115,217 | 12/1963 | Butler | 188/71.9 |
| 3,243,016 | 3/1966 | Swift | 188/196 BA |
| 3,314,506 | 4/1967 | Belart et al. | 188/71.9 |
| 3,701,400 | 10/1972 | Burnett et al. | 188/72.8 |
| 3,709,333 | 1/1973 | Buyze | 188/71.9 |

*Primary Examiner*—Trygve M. Blix
*Assistant Examiner*—Edward R. Kazenske
*Attorney, Agent, or Firm*—Scrivener Parker Scrivener and Clarke

[57] ABSTRACT

A vehicle disc brake assembly including a clamping member and an applying member for applying a friction pad assembly to one face of a rotatable disc, the applying member itself being adapted to be bodily advanced automatically towards the disc to compensate for wear of the friction pad assembly. Adjustment is sensed by a sleeve member having a toothed clutch face for engagement with a complementary face on a housing in which the applying member is installed to screw the housing through the clamping member.

5 Claims, 3 Drawing Figures

DISC BRAKE ASSEMBLIES FOR VEHICLES

SPECIFIC DESCRIPTION

This invention relates to disc brake assemblies for vehicles of the kind comprising friction pad assemblies for engagement with opposite faces of a rotatable disc in which at least one of the friction pad assemblies is applied directly to one face of the disc by applying means, and means are provided for compensating automatically for wear of friction surfaces so that braking clearances are maintained at a predetermined minimum value.

In disc brake assemblies of the kind set forth automatic adjustment to compensate for wear of the friction surfaces can be accomplished by incorporating, between a friction pad assembly and the applying means which acts directly on that pad assembly, a strut or thrust member of which the effective length is increased automatically to advance that pad assembly towards the disc. This may have the effect of increasing the effective length of the applying means itself.

According to our invention, in a disc brake assembly of the kind set forth the applying means is itself adapted to be advanced automatically towards the disc to compensate for wear of the friction surface of at least the friction pad assembly which it is adapted to apply directly to the disc.

Thus, the brake applying means is simply repositioned relative to the disc, with its effective length being maintained at a normal value.

When the brake assembly is of the single-sided reaction type in which the brake applying means is adapted to apply one friction pad assembly, known as the directly actuated pad assembly, directly to one face of the disc and the other friction pad assembly, known as the indirectly actuated friction pad assembly, is applied to the opposite face of the disc by the reaction of the applying means which is transmitted to the indirectly actuated friction pad assembly through a clamp assembly, movement of the brake applying means towards the disc is accompanied by movement in the opposite direction of the clamp assembly whereby the indirectly actuated friction pad assembly is advanced towards the disc to compensate also for wear of the friction surface of that pad assembly.

Conveniently the applying means comprises an actuator assembly adjustably housed in a limb of the clamp assembly and of which the effective length is adapted to be increased to apply the brakes and adjuster means are incorporated for advancing the actuator assembly bodily towards the disc with respect to the limb when the wear on the friction surface exceeds a predetermined value.

When parts of the actuator assembly are relatively rotatable in the application of the brake, the adjuster means are operative to advance the actuator assembly when relative rotation exceeds a predetermined value. In such a construction, the actuator assembly is located in a housing which is screw-threadably engaged in the limb, and the adjuster means comprises a clutch mechanism operative to rotate the housing with respect to the limb when relative rotation between the parts of the actuator assembly exceeds a predetermined value as such parts are returned to inoperative retracted positions at the termination of a braking application.

One embodiment of our invention is illustrated in the accompanying drawings in which.

Figure 1:
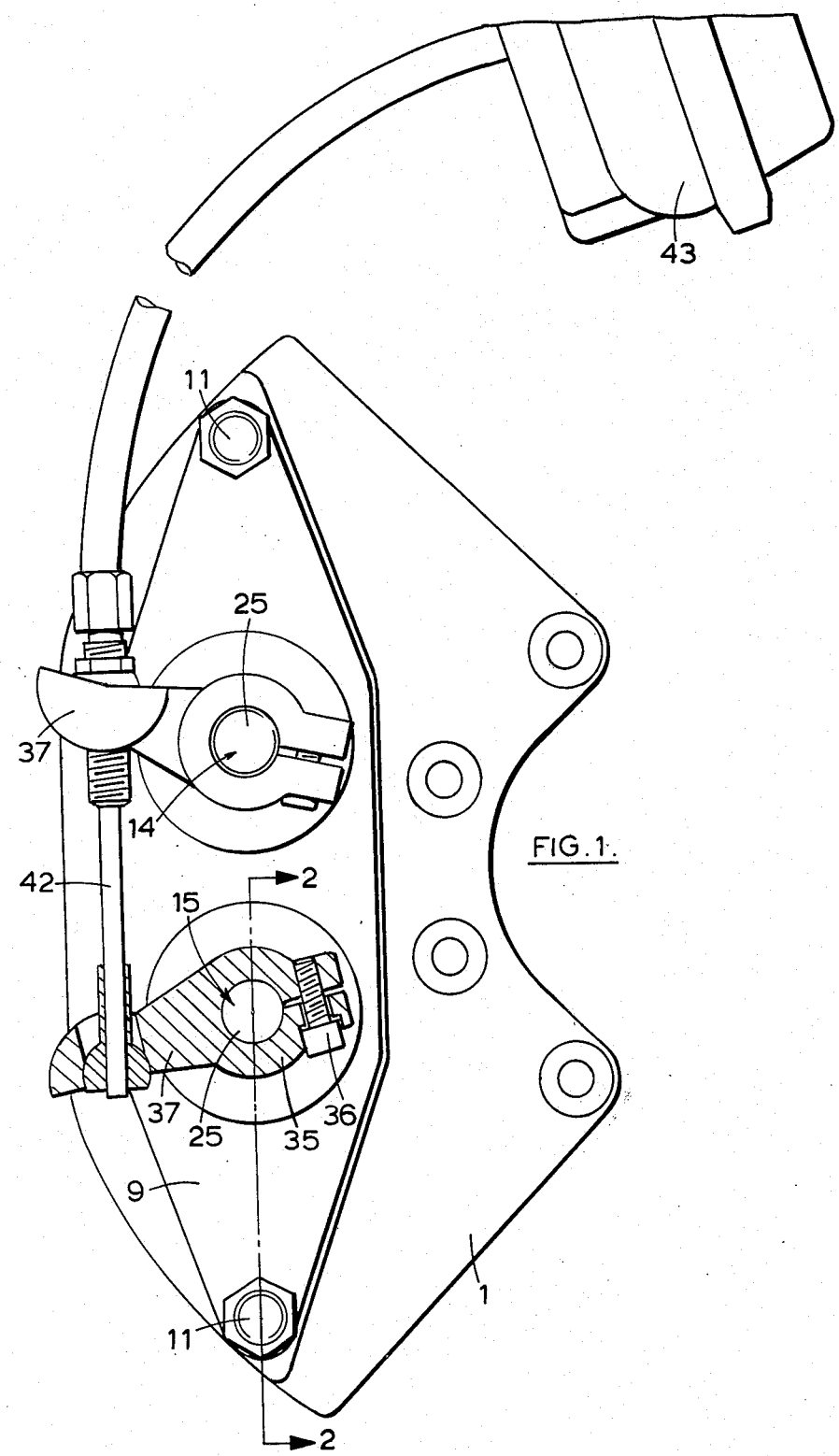
FIG. 1 is a part sectional end elevation of a disc brake assembly for a rail vehicle.
Figure 2:
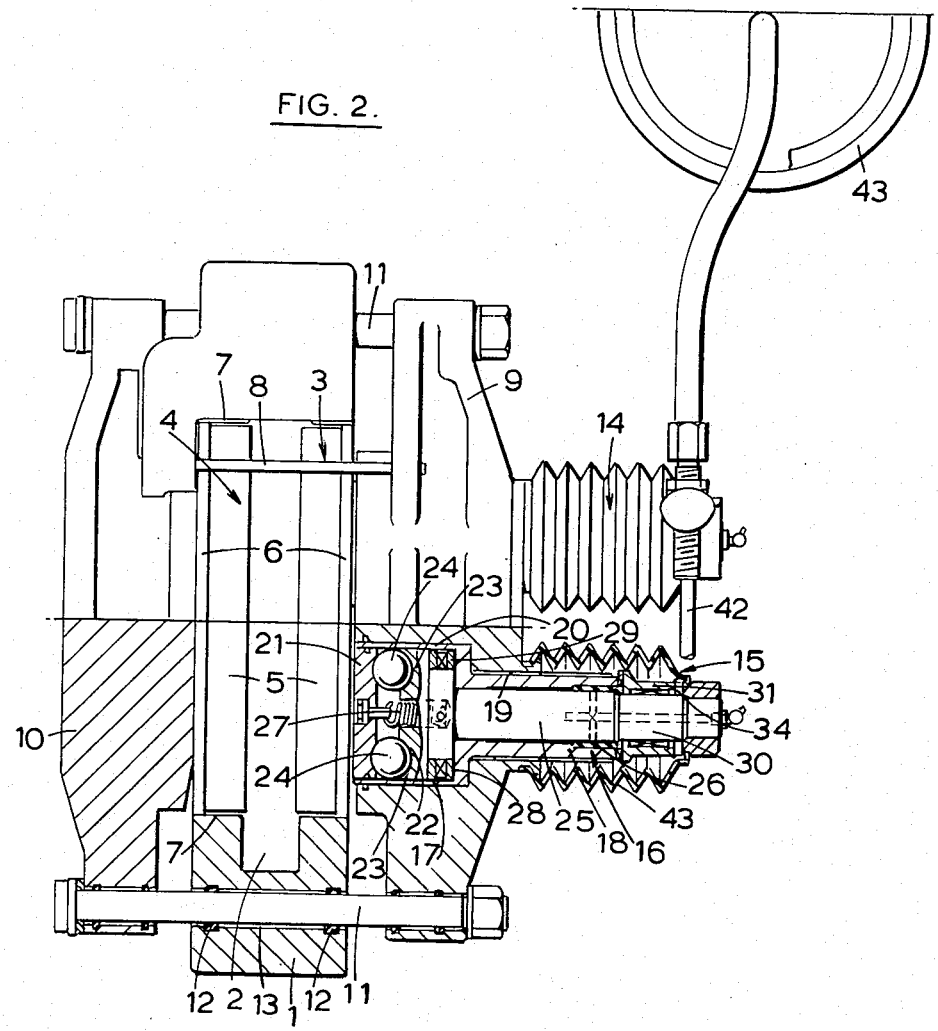
FIG. 2 is a plan view of the brake assembly including a section on line 2—2 of FIG. 1.
Figure 3:
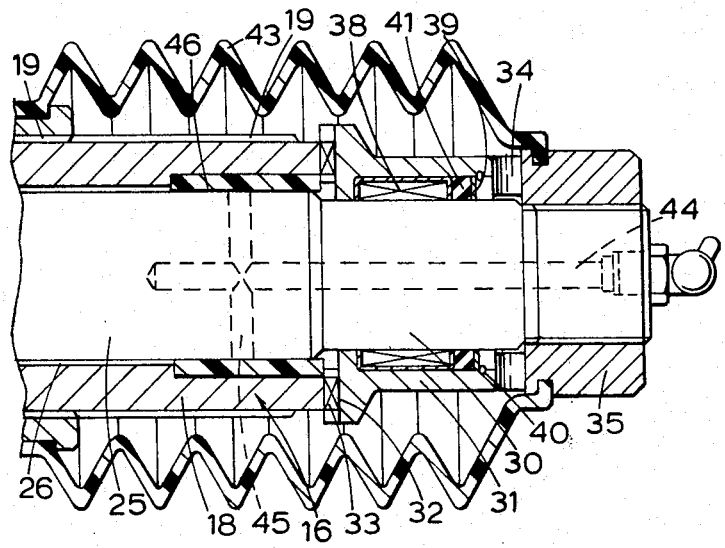
FIG. 3 is a portion of FIG. 2 on an enlarged scale showing automatic adjuster means.

In the brake assembly illustrated in the accompanying drawings, 1 is a stationary member of generally U-shaped outline straddling a portion of the periphery of a rotatable disc, not shown, and mounted on a fixed part adjacent to one face of the disc. The stationary member 1 is provided in its radially outermost face with a radial opening 2 in which friction pad assemblies 3 and 4 are housed and each friction pad assembly 3,4 comprises a friction pad 5 carried by a rigid backing-plate 6. The opposite ends of the backing-plate 6 are slidably guided on circumferentially spaced opposite end walls 7 of the opening 2 which take the drag on the friction pad assemblies 3 and 4 when the brake is applied. Movement of the friction pad assemblies 3 and 4 in a radially outwards direction is prevented by detachable pins 8 extending across the opening 2.

A clamp assembly slidably mounted on the stationary member 1 comprises a pair of spaced parallel beams 9 and 10 for engagement with backing-plates 6. The beams 9 and 10 are chordal with respect to the disc and are coupled at their outer circumferential ends by means of a pair of circumferentially spaced draw bars 11 which are guided through, and floatingly mounted in, resilient bushes 12 located in openings 13 in the outer ends of the stationary member 1.

Brake applying means are incorporated in the beam 9, hereinafter referred to as the actuating beam, and operation of the applying means urges the friction pad assembly 3 directly into engagement with the adjacent face of the disc. The friction pad 4 is applied to the opposite face of the disc by the reaction of the applying means on the actuating beam 9 which is transmitted through the draw bars 11 and acts on the friction pad assembly 4 through the beam 10, hereinafter referred to as the reaction beam.

As illustrated in the drawings, the brake applying means comprises two circumferentially spaced actuator assemblies 14, 15 acting on the backing plate 6 of the friction pad assembly 3. The actuator assemblies are identical in construction so that only the actuator assembly 15 has been illustrated and will be described in detail.

The actuator assembly 15 comprises a housing 16 having an enlarged cylindrical head 17 carried at the inner end of an integral stem 18. The stem 18 is screwed into a screw-threaded bore 19 in the actuating beam 9 and the head 17 is received in a counterbore 20 at the inner end of the bore 19. The housing 16 houses an expander mechanism comprising opposed ramp plates 21, and 22 provided in adjacent faces with complementary part spherical recesses 23 in which are located balls 24. The ramp plate 21 is keyed against rotation relative to the head 17 and the ramp plate 22. Thus the ramp plate 22 comprises a head at the inner end of a spindle 25 rotatably mounted in a longitudinal bore 26 in the stem 18. The spindle 25 projects, by a substantial distance, from the end of the stem 18 remote from the head 17.

In the inoperative retracted position shown in the drawings the ramp plate 21 is urged towards the ramp plate 22 by means of a tension spring 27 connecting the plates and any thrust acting on the ramp plate 22 is transmitted to a shoulder 28 at a step in the change in diameter between the bore 26 and the inner surface of the head 17 through a thrust bearing 29 interposed between the plate 22 and the shoulder 28. Rotation of the spindle 25 in the application of the brake causes the ramp plate 22 to rotate with respect to the ramp plate 21. The balls 24 ride up ramps defined by the recesses 23 to urge the ramp plate 21 outwardly thereby applying the friction pad assembly 3 directly to the disc. The reaction, which is transmitted to the shoulder 28 through the thrust bearing 29, acts on the actuating beam 9 to urge the friction pad assembly 4 into engagement with the opposite face of the disc through the draw bars 11 and the reaction beam 10.

In accordance with our present invention, automatic adjuster means are embodied in the brake to advance the actuator assemblies 14, 15 bodily towards the disc simultaneously to determine retracted positions of the friction pad assemblies 3 and 4 which maintain the braking clearance at predetermined values, irrespective of wear of the material of the friction pads 5. As illustrated in the drawings, the portion of the spindle 25 which projects from the stem 18 is reduced in diameter at 30 and is enclosed within a sleeve member 31. A clutch face 32 at the inner end of the sleeve member 31 formed with teeth or dogs is urged into engagement with a clutch face 33 of complementary outline and configuration at the free end of the stem 18 by means of a spring washer 34 clamped between the outer end of the sleeve member 31 and a nut member 35 clamped, by means of a pinch pin 36, to the free end of the stem 30 and having an integral radial arm or lever 37. The sleeve member 31 is itself coupled to the spindle 25 by means of a one-way clutch 38 between the outer end of which an annular washer 39 retained in position by a circlip 40 is located a friction clutch 41, conveniently in the form of a resilient O-ring.

In the application of the brake the spindles 25 of the actuating assemblies 14 and 15 are rotated in opposite directions by angular movement of the arms or levers 37 which are coupled by flexible inextensible cable 42 of which the effective length is adapted to be shortened to draw the arms or levers 37 together, upon operation of an actuator 43. During rotation of the spindle 25, friction between the friction clutch 41, the spindle 25 and the sleeve member 31, causes the sleeve member 31 to rotate with the spindle 25 until any clearance between the interengaging teeth or dogs on the clutch faces 32 and 33 is taken up. The clearance between the clutch faces 32 and 33 defines the desired braking clearances. Thus, the clearance will only be taken up when the wear of the material of the friction pads 5 has attained a value when adjustment is required. When this occurs and after the clearance has been taken up, further rotation of the spindle 25 is accompanied by slippage of the friction clutch 41. This is permitted by the one-way clutch 38 over-running in this direction. When the brake is released, the spindle 25 rotates in the opposite direction and, after the clearance between the clutch faces 32 and 33 is taken up due to relative rotation in the opposite direction, the one-way clutch 38 drives the sleeve member 31 with the spindle 25. This rotational movement of the sleeve member 31 is transmitted to the housing 16 through the clutch faces 32 and 33, causing the housing 16 to be screwed through the actuating beam 9 and towards the disc to define a retracted position of the friction pad assemblies 3 and 4 which is advanced relatively with respect to the disc and the previous retracted position. This compensates for wear of the friction pads 5 and maintains the braking clearances at a constant value. Adjustment is therefore achieved automatically, and without any increase in the effective length of the applying means.

Since the spindles 25 are rotated in opposite directions in the application of the brake and, as a consequence, are rotated in opposite directions when the brake is released and adjustment may take place, the screw-threaded engagements between the stems 18 of the actuator assemblies 14 and 15 and the actuating beam 9 are of opposite hands.

Each actuator assembly and adjuster means are enclosed within a flexible boot 43 and the spindles 25 are drilled and cross drilled at 44 and 45 to provide lubrication for bearings 46 in which the spindles 25 are journalled at the outer ends of the longitudinal bores 26.

To reset the adjuster means, for example after friction pad assemblies have been replaced, the boots 43 are removed and the sleeve members 31 are urged out of engagement with the stems 18 against the force in the spring washers 30. Thereafter, by the use of suitable tools, each housing 16 can be unscrewed from the actuating beam 9.

We claim:

1. A disc brake assembly for vehicles comprising friction pad assemblies for engagement with opposite faces of a rotatable disc, applying means for applying one of said friction pad assemblies to said disc, adjuster means for automatically advancing said applying means itself towards said disc to compensate for wear of the friction surface of at least the said one friction pad assembly, and a clamp assembly including a limb on one side of said disc adjacent to that which is adapted to be engaged by said friction pad assembly, wherein said applying means comprises a housing having a hollow enlarged head carried at the inner end of a stem which has a longitudinally extending bore and which is screwthreadably engaged in said limb of said clamp assembly, inner and outer opposed ramp plates disposed within said head of which said outer ramp plate acts on said friction pad assembly and is keyed against rotation with respect to said housing and said inner ramp plate comprises a head at an inner end of a spindle rotatably mounted in said bore, and balls located in complementary recesses in adjacent faces of said plates to affect separation of said plates and apply said friction pad assembly in said disc when said spindle is rotated, and wherein said adjuster means comprises a sleeve member having at its inner end a toothed clutch face for engagement with a complementary toothed clutch face at the free end of said stem of said housing, said sleeve member surrounding a portion of said spindle which projects from said stem, a one-way clutch coupling said sleeve member to said spindle, and resilient means acting between the end of said sleeve member remote from said housing and an abutment at said free end of the spindle to urge said clutch faces into engagement, the clearance between teeth of said clutch faces defining a braking clearance whereby after said clearance has been taken up upon rotation of said spindle in the application of the brake, subsequent rotation of said spindle is accompanied by said one-way clutch overrunning and, when the brake is released, said one-way clutch rotatably drives said sleeve member, such rotational movement being transmitted through said clutch faces to said housing which is screwed through said limb and towards the disc whereby said actuating means is advanced bodily.

2. A disc brake as claimed in claim 1, wherein a friction clutch detachably couples said one-way clutch to said spindle, and said friction clutch is adapted to slip to permit said one-way clutch to over-run.

3. A disc brake as claimed in claim 1, wherein said brake is of the single sided-reaction type and a second friction pad assembly is applied indirectly to an opposite face of said disc by the reaction of said applying means which is transmitted to said second friction pad assembly through said clamp assembly, movement of the brake applying means towards said disc being accompanied by movement of said clamp assembly in an opposite direction whereby said second friction pad assembly is advanced towards said disc to compensate also for wear of the friction surface of said second pad assembly.

4. A disc brake as claimed in claim 1, wherein said brake applying means comprises two circumferentially spaced actuator assemblies acting on the said friction pad assembly and the effective length of both actuator assemblies are increased simultaneously to apply the said friction pad assembly to said disc, both actuator assemblies being advanced simultaneously towards said disc when the wear of said friction surfaces has exceeded a predetermined value.

5. A disc brake assembly for vehicles comprising a stationary member, an axially fixed rotatable disc, first and second friction pad assemblies for engagement with opposite faces of said disc guided in said stationary member, a clamp assembly straddling the peripheral edge of said disc and movable axially with respect to said stationary member, said clamp assembly having a first limb acting on said first friction pad assembly and a second limb, applying means for applying said second friction pad assembly directly to said disc comprising a housing screw-threadedly engaged in said second limb and acting between said second limb and said first pad assembly, a first part of said applying means located in said housing, means keying said first part against rotation relative to said housing, and a second part of said applying means rotatable in said housing relative to said first part to increase the effective length of said applying means, and adjuster means for rotating the entire housing relative to said second limb when rotation of said second part exceeds a predetermined value as said parts are returned to inoperative retracted positions at the termination of a braking application whereby the overall axial length of said brake is reduced upon wear of said friction pad assemblies.

* * * * *